(12) United States Patent
Lou et al.

(10) Patent No.: US 10,639,719 B2
(45) Date of Patent: May 5, 2020

(54) GRAIN BOUNDARY ENGINEERING FOR ADDITIVE MANUFACTURING

(71) Applicant: General Electric Company, Schenectady, NY (US)

(72) Inventors: Xiaoyuan Lou, Rexford, NY (US); Evan Jarrett Dolley, Clifton Park, NY (US); Martin Matthew Morra, Schenectady, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 614 days.

(21) Appl. No.: 15/279,182

(22) Filed: Sep. 28, 2016

(65) Prior Publication Data

US 2018/0085830 A1 Mar. 29, 2018

(51) Int. Cl.
*B22F 3/24* (2006.01)
*B33Y 80/00* (2015.01)
*C21D 1/34* (2006.01)
*B33Y 10/00* (2015.01)

(52) U.S. Cl.
CPC ............... *B22F 3/24* (2013.01); *B33Y 80/00* (2014.12); *C21D 1/34* (2013.01); *B22F 2998/10* (2013.01); *B33Y 10/00* (2014.12); *C21D 2201/05* (2013.01); *Y02P 10/295* (2015.11)

(58) Field of Classification Search
CPC . B22F 3/008; B22F 3/24; B33Y 10/00; B33Y 80/00; C21D 1/34; C21D 2201/05
See application file for complete search history.

(56) References Cited

U.S. PATENT DOCUMENTS

| 3,807,991 | A | 4/1974 | Gregory et al. |
| 4,465,525 | A | 8/1984 | Yoshimura et al. |
| 4,919,885 | A | 4/1990 | Meyer et al. |
| 6,544,357 | B1 | 4/2003 | Hehmann et al. |
| 8,876,990 | B2 | 11/2014 | Schuh et al. |
| 2004/0182202 | A1* | 9/2004 | Geving ................... C22C 33/02 75/252 |
| 2005/0121112 | A1 | 6/2005 | Mazumder et al. |
| 2011/0226391 | A1 | 9/2011 | Kim et al. |
| 2014/0163717 | A1* | 6/2014 | Das ...................... B22F 3/1055 700/119 |
| 2015/0041025 | A1* | 2/2015 | Wescott ................ B23K 9/042 148/538 |

(Continued)

OTHER PUBLICATIONS

Murray, P.T., et al.; "Laser surface melting of stainless steel anodes for reduced hydrogen outgassing", 2016 IEEE International Conference on Plasma Science (ICOPS), pp. 1, Jun. 19-23, 2016, Banff, AB, Canada.

*Primary Examiner* — Veronica F Faison
(74) *Attorney, Agent, or Firm* — Fletcher Yoder, P.C.

(57) ABSTRACT

In one embodiment, a method of manufacturing a metal part using a laser or electron beam during a powder bed additive manufacturing process includes melting each of a number of layers of metal powder of the metal part with an effective amount of energy using the laser or electron beam to form the metal part such that at least one or more portions of the metal part have a critical amount of residual strain. The method also includes performing a heat treatment on the metal part that transforms the residual strain into substantially distributed coincidence site lattice (CSL) grain boundaries, low angle grain boundaries, or both in the metal part.

20 Claims, 4 Drawing Sheets

(56) References Cited

U.S. PATENT DOCUMENTS

| | | | |
|---|---|---|---|
| 2016/0273079 A1* | 9/2016 | Das | C30B 11/007 |
| 2017/0021455 A1* | 1/2017 | Dallarosa | B33Y 10/00 |
| 2017/0027624 A1* | 2/2017 | Wilson | C22F 1/183 |
| 2017/0056138 A1* | 3/2017 | Zandinejad | A61C 13/0004 |
| 2017/0072471 A1* | 3/2017 | Welch | B22F 1/02 |

* cited by examiner

GRAIN BOUNDARY ENGINEERING FOR ADDITIVE MANUFACTURING

STATEMENT REGARDING FEDERALLY SPONSORED RESEARCH & DEVELOPMENT

This invention was made with Government support under contract number DE-NE0008428 awarded by the United States Department of Energy. The Government has certain rights in the invention.

BACKGROUND

The subject matter disclosed herein relates to grain boundary engineering and, more specifically, to using a laser or electron beam additive process to manufacture metal components with coincidence site lattice grain boundaries and/or low angle grain boundaries that improve resistance to stress corrosion cracking and intergranular corrosion.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Microscopically, polycrystalline metallic alloys are made up of individual crystallites commonly referred to as grains. These grains are connected together via grain boundaries. Grain boundaries are generally formed through recrystallization and grain growth process during metal part fabrication and heat treatment. After the metal process, most grains were connected through highly misoriented and equiaxed grain boundaries. Such grain boundaries can influence the mechanical properties of the metal, such as high and low cycle fatigue lives, yield strength, and/or creep. However, equiaxed random grain boundaries can be susceptible to stress corrosion cracking, which may be undesirable in certain application environments, such as oil and gas, nuclear, power generation, health care devices in the human body, and/or aircraft engines.

There are other types of grain boundaries, such as coincidence site lattice (CSL) grain boundaries and low angle grain boundaries, that exhibit improved properties as compared to equiaxed grain boundaries. CSL grain boundaries may refer to grain boundaries that are less than Σ29, and low angle grain boundaries may refer to grain boundaries between 1° and 5°. The improved properties exhibited by the CSL grain boundaries and low angle grain boundaries may include increased resistance to stress corrosion cracking by inhibiting intergranular cracking due to a disrupted network of the grain boundaries, increased hold time fatigue, and the like.

Grain boundary engineering may be performed in attempt to create CSL grain boundaries and/or low angle grain boundaries. Grain boundary engineering generally refers to techniques related to processing, evaluating, and classifying grain boundaries. Manipulation and optimization of grain boundaries in polycrystalline materials may be performed using grain boundary engineering. It is now recognized that improved grain boundary engineering techniques are desirable.

BRIEF DESCRIPTION

In one embodiment, a metal part includes a material. At least a portion of the material is formed by melting metal powder with a laser or electron beam during a powder based additive manufacturing process. The portion receives an effective amount of energy from the laser or electron beam to introduce an amount of residual strain. The portion is configured to substantially release the residual strain and transform into a grain boundary engineered material having substantially distributed coincidence site lattice (CSL) grain boundaries, low angle grain boundaries, or both upon heat treatment.

In one embodiment, a method of manufacturing a metal part using a laser or electron beam powder bed additive manufacturing process includes melting each of a number of layers of metal powder of the metal part with an effective amount of energy using a laser or electron beam to form the metal part such that at least one or more portions of the metal part have a critical amount of residual strain, and performing a heat treatment on the metal part that transforms the residual strain into substantially distributed coincidence site lattice (CSL) grain boundaries, low angle grain boundaries, or both in the metal part.

In one embodiment, a metal part includes a metal microstructure. At least a portion of the metal microstructure includes substantially distributed coincidence site lattice (CSL) grain boundaries, low angle grain boundaries, or both that improve hold time fatigue and resistance to stress corrosion cracking. The metal microstructure is formed using a laser or electron beam powder bed additive manufacturing process that delivers an effective amount of energy to introduce an amount of residual strain, and the metal part subsequently undergoes a heat treatment that converts the residual strain into the substantially distributed CSL grain boundaries, low angle grain boundaries, or both in the portion.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
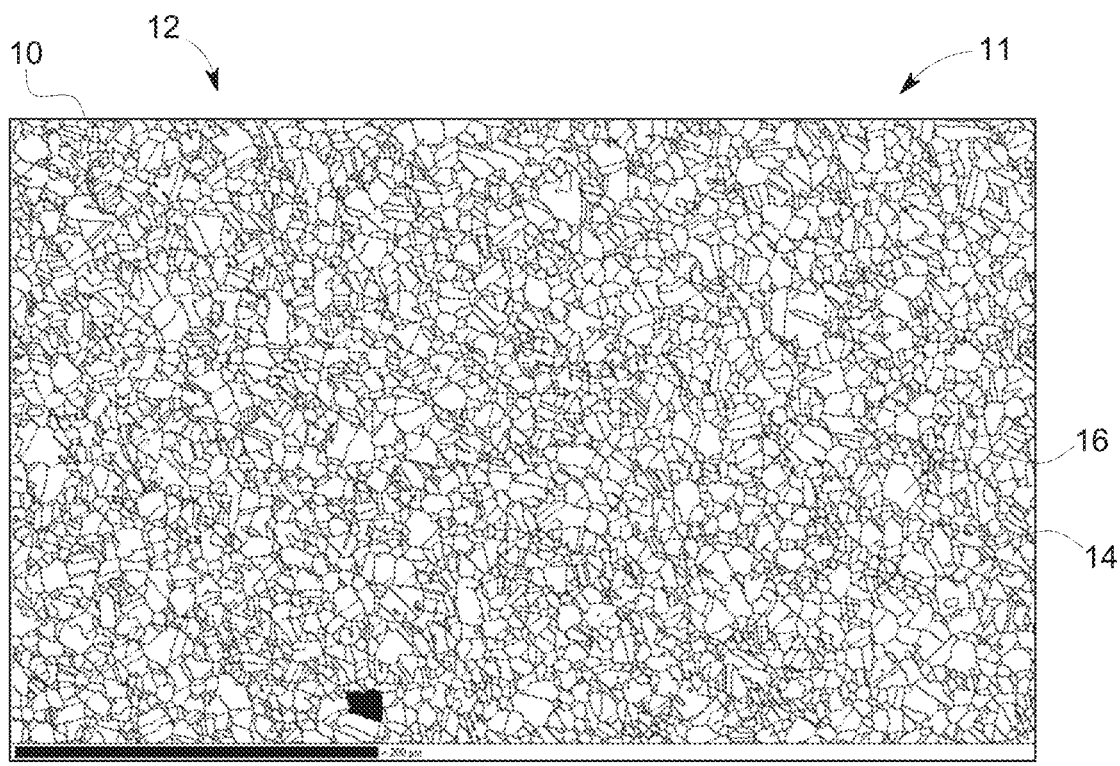
FIG. 1 is an electron back-scattered diffraction (EBSD) map of a microstructure of a metal part having equiaxed grains and normal grain boundaries.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Stress corrosion cracking shortens service life (and eventually lead to the failure of) metallic parts that operate in harsh environments (e.g., high temperature, high pressure, and/or oxidative environments). In some instances, grain boundary engineering may be used to control (e.g., set, modify) the grain structure and produce coincidence site lattice (CSL) grain boundaries and/or low angle grain boundaries, which can improve the metal part's resistance to stress corrosion cracking. CSL grain boundaries may refer to grain boundaries that are less than Σ29, and low angle boundaries may refer to grain boundaries that are between 1° and 5°. One type of grain boundary engineering involves forging. However, while metal parts having simple geometries (e.g., tubes, cylinders, plates) can be manufactured to have a somewhat uniform distribution of CSL grain boundaries and/or low angle grain boundaries using a forging process, it may be appreciated that three-dimensional (3D) metal parts having complex geometries (e.g., disks, nuts, bolts, valve bodies) generally cannot be manufactured via forging due to the inhomogeneous strain distribution developed in complex geometries during forging.

Accordingly, the present disclosure generally relates to manufacturing metal parts, including metal parts having complex 3-D geometries, that include CSL and/or low angle grain boundary microstructures that resist (e.g., block, prevent, slow) intergranular cracking, such as stress corrosion cracking, and hold time fatigue. Hold time fatigue may refer to a low-cycle fatigue with a constant load hold time at its maximum load. The disclosed manufacturing technique generally involves controlling the parameters of a laser or electron beam powder bed additive process to create a desired amount of residual strain in a metal part. The technique further includes heat treating the metal part to utilize the critical strain to produce CSL grain boundaries and/or low angle grain boundaries in the metal part. As discussed below, the parameters of the laser or electron beam powder bed additive process may relate to a laser or electron beam scan speed, the energy output of the laser or electron beam, a hatching space, shielding gas flow, vacuum level, scan strategy/pattern, layer thickness and the like. Further, the heat treatment parameters may include time and temperature and may be dependent on the amount of residual strain present in the metal, the type of metal, the grain size in the metal, or the like. In some embodiments, the metal may be an iron-based alloy (e.g., stainless steel), or a nickel-based alloy. As such, the present disclosure enables the manufacture of complex metal parts with improved resistance to stress corrosion cracking, improved hold time fatigue, and that demonstrate an enhanced service life in harsh environments.

Turning now to FIG. 1, an optical micrograph 10 of a metal part 11 having a microstructure 12 with equiaxed grains 16 and normal grain boundaries 14 is depicted. As described above, the grain boundaries 14 generally refer to the interfaces between grains (crystals) 16 of different crystallographic orientation that comprises the microstructure 12. More specifically, the microstructure 12 in the illustrated example is a portion of a 316L stainless steel metal part 11 in which the microstructure 12 is in a fully equiaxed condition (e.g., axes are approximately the same length of the grains 16). As such, the microstructure 12 represents an example metal part 11 manufactured without using the disclosed grain boundary engineering technique. Instead, the microstructure 12 illustrated in FIG. 1 may be formed after stainless steel is forged at high temperature and to high plastic strains (approximately 70%) and then heat treated to fully recrystallize the metal in a normal manner during manufacture of the metal part 11, forming the grains 16 and an interconnected network of grain boundaries 14 that approximate rough geometric shapes. The interconnected network of equiaxed random grain boundaries 14 enhances the susceptibility of the microstructure 12 to intergranular corrosion and stress corrosion cracking along the grain boundaries 14, which may eventually lead to failure of the metal part.

Figure 2:
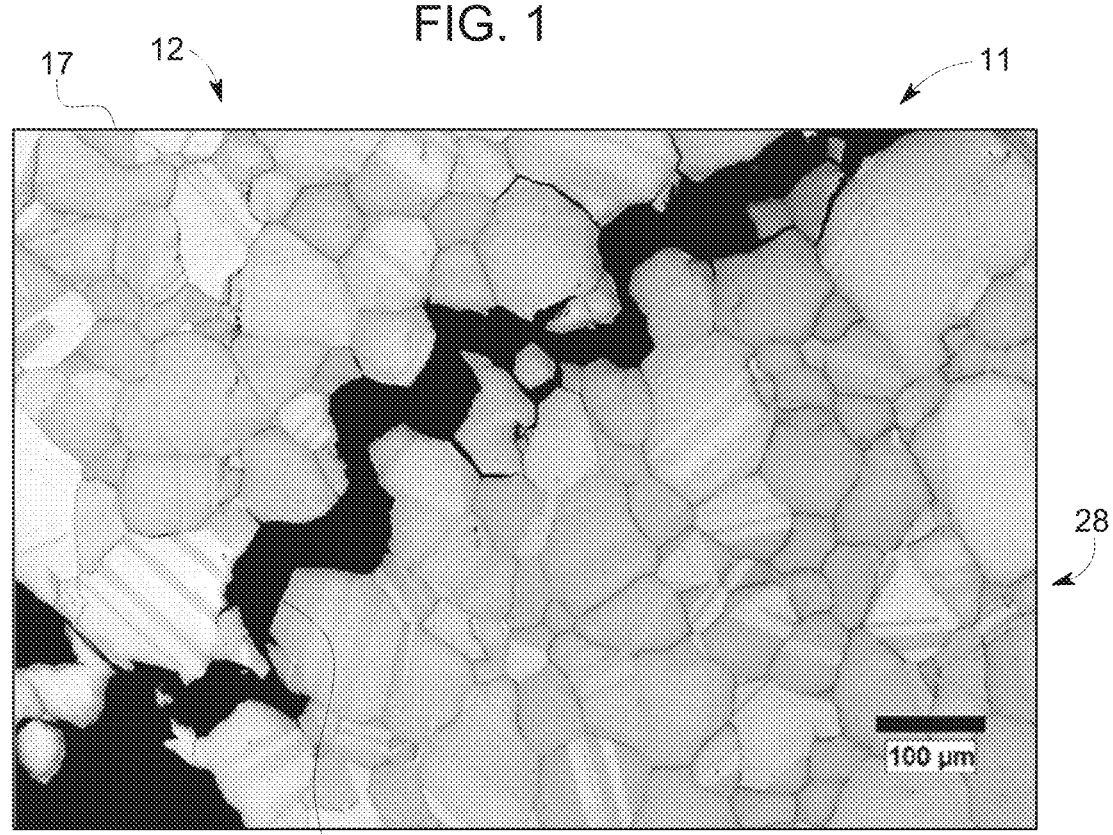
FIG. 2 is an electron back-scattered image of the microstructure of FIG. 1 including an example intergranular crack path along the connected equiaxed random grain boundaries.

For example, FIG. 2 depicts an electron back scattered image 17 of the microstructure 12 of the metal part 11 of FIG. 1 including an example intergranular crack path 18 along the connected equiaxed random grain boundaries 14. As depicted in FIG. 2, the grain boundaries 14 are networked (e.g., linked, coupled, form a continuous path) together as a result of normal recrystallization. As such, the crack 18 follows a path along the networked grain boundaries 14 and can propagate through the entire illustrated microstructure 12, which may eventually cause the metal part 11 to fracture and/or fail. To modify the grain structure and improve resistance to stress corrosion cracking and intergranular corrosion, a process commonly referred to as grain boundary engineering may be used.

Figure 3:
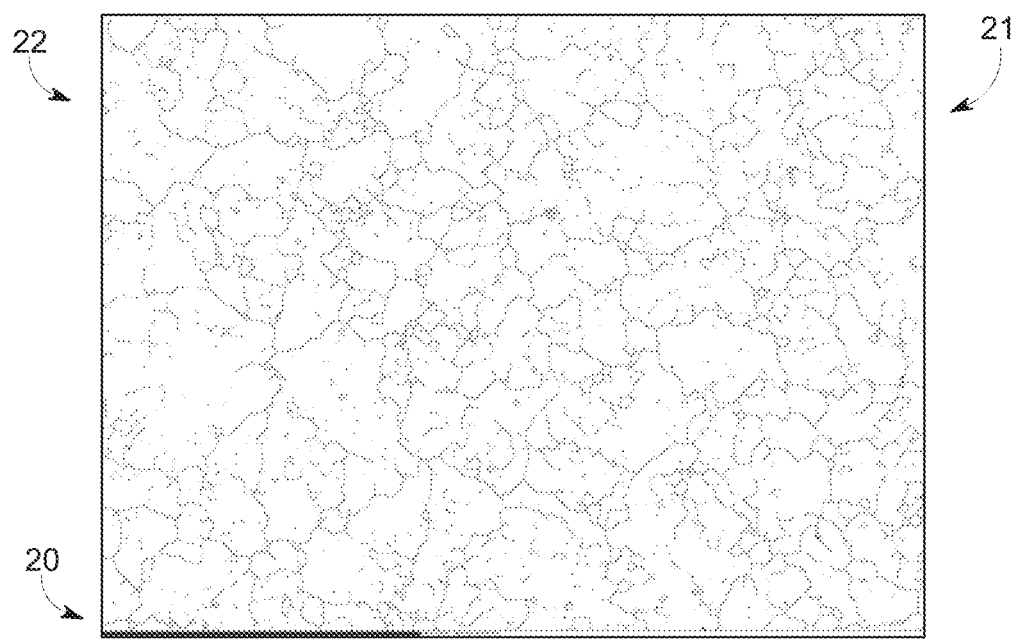
FIG. 3 is an EBSD map that illustrates a microstructure including a broken network of equiaxed random grain boundaries of another metal part processed by a forging process for grain boundary engineering.

One such grain boundary engineering process involves forging a metal part introduce a microstructure having discontinuous grain boundaries. To illustrate, FIG. 3 depicts an electron backscattered diffraction map 20 that illustrates a metal part 21 manufactured using a forging process, which results in microstructure 22 having a broken (e.g., disconnected, isolated) network of grain boundaries. The illustrated microstructure 22 is formed by first hot/warm working the stainless steel at elevated temperatures and to strains above 70% and then performing a recrystallization heat treatment to form random high angle grain boundaries. Then, cold and/or warm forging is done that imparts a critical strain of below 15% and then a recrystallization heat treatment is applied to the microstructure 22 to modify the random high angle grain boundaries into the desired disconnected grain boundary network of CSL grain boundaries and/or low angle grain boundaries. It should be noted the term "critical" in critical strain refers to an amount of strain that may cause a transformation from one state to another (e.g., from equiaxed grain boundaries to abnormal grain boundaries). As displayed, the CSL grain boundaries and/or low angle grain boundaries form a broken network (e.g., discontinuous grain boundaries) that may provide enhanced resistance to intergranular corrosion and stress corrosion cracking, as well as improved hold time fatigue.

Figure 4:
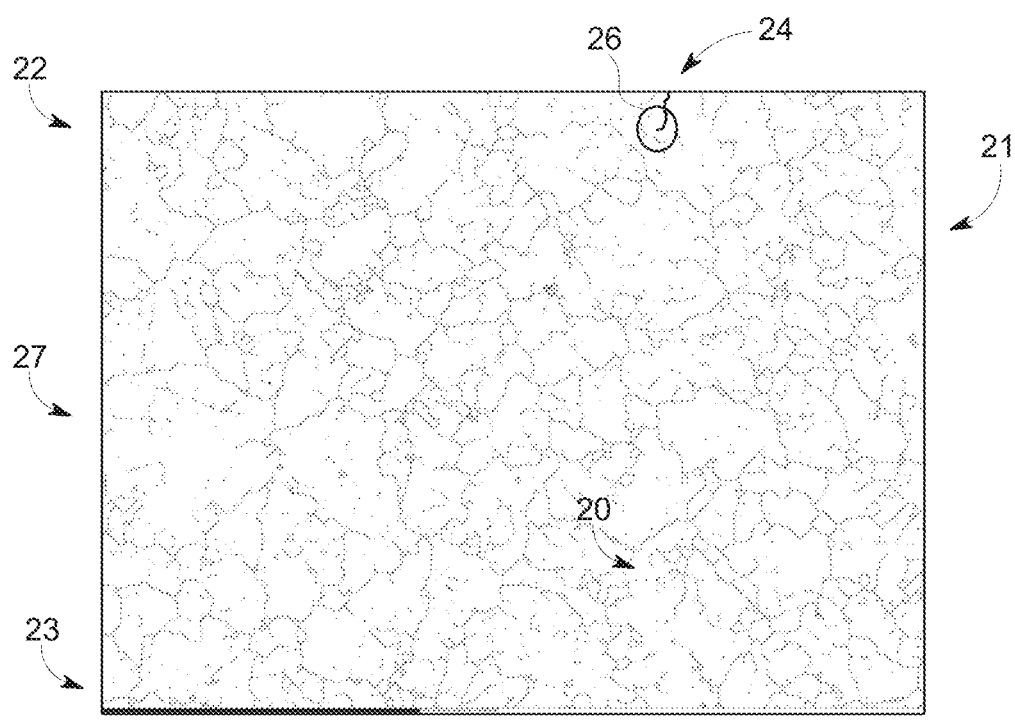
FIG. 4 is the EBSD map of the microstructure of FIG. 3 including an example crack path along a broken network of grain boundaries.

For example, FIG. 4 depicts another electron backscattered diffraction map 23 of the metal part 21 illustrated in FIG. 3, wherein the microstructure 22 illustrated in FIG. 4 includes an example crack path 24 that extends along the broken network of grain boundaries. As depicted, the crack path 24 does not extend completely through the illustrated portion of the microstructure 22. Instead, the crack path 24 terminates at an area 26 in the microstructure 22 where the grain boundary network is disrupted as a result of the CSL grain boundaries and/or the low angle grain boundaries. Thus, the crack path 24 is blocked (e.g., prevented, isolated) from forming a fracture through the metal part 21, thereby prolonging the service life of the part, especially under applied or residual stresses in harsh (e.g., corrosive) operating environments. In other words, since a greater energy barrier is present to disrupt (e.g., fracture, break apart) the discontinuous network of grain boundaries 27, as illustrated in FIG. 4, than to disrupt the continuous network of grain boundaries 28, as illustrated in FIG. 2, the metal part 21 represented in FIG. 4 demonstrates increased resistance to stress corrosion cracking. To disrupt the discontinuous network of grain boundaries 27 in FIG. 4, a mix-mode of intergranular and transgranular cracking would likely be present, where more energy is necessitated to crack transgranularly (e.g., through the grains) than intergranularly (e.g., along the grain boundaries).

However, inasmuch as the microstructure 22 produced by forging includes some CSL grain boundaries and/or low angle grain boundaries, it should be noted that not all of the grain boundaries technically qualify as CSL grain boundaries and/or low angle grain boundaries. To measure grain boundary angles in a metal part, microscopic analysis may be used to analyze a cross-section of the metal part and examine the microstructure. For example, after a metal part is cross-sectioned, a scanning electron microscope (SEM) and back-scattered electron imaging may be used to analyze the shape and orientation of the grains of the microstructure. Electron back-scattered diffraction may be used to determine how the grains are arranged, the orientation of the grains relative to one another, the grain boundary angles, and the amount of residual plastic strain present in the material. Desirable ratings of the grain boundary angles may include Σ3, Σ5, Σ7, Σ9, Σ11, Σ13a, Σ13b, Σ15, Σ17a, Σ17b, Σ19a, Σ19b, Σ21a, Σ21b, Σ23, Σ25a, Σ25b, Σ27a, Σ27b, Σ29a, Σ29b, Σ31a, Σ31b, Σ33a, Σ33b, Σ33c, Σ35a, Σ35b, other lower angle boundaries (1° to 5° angle low angle boundaries), and the like. As discussed above, CSL grain boundaries may include grain boundaries that are less than Σ29. These grain boundary ratings may be desirable to enable enhanced resistance to stress corrosion cracking and/or intergranular corrosion, as well as improved hold time fatigue.

The CSL grain boundaries and/or the low angle grain boundaries that are produced by forging and other grain boundary engineering processes may not be substantially distributed (e.g., approximately 40% to 80% of microstructure area) across the entire microstructure of the metal part. Additionally, as mentioned above, forging processes are generally limited in their ability to produce a substantial distribution of CSL grain boundaries and/or low angle grain boundaries unless restricted to the manufacture of metal parts with simple geometries, such as tubes, cylinders, or plates (e.g., not complex 3-D geometries). Thus, it is now recognized that enhanced grain boundary engineering processes are desirable to produce authentic (e.g., non-twin) and substantially distributed (e.g., 40% to 80% of microstructure area) CSL grain boundaries and/or low angle grain boundaries that disconnect the regular grain boundary network and improve hold time fatigue and/or resistance to stress corrosion cracking in fabricated metal parts with complex geometries.

Figure 5:
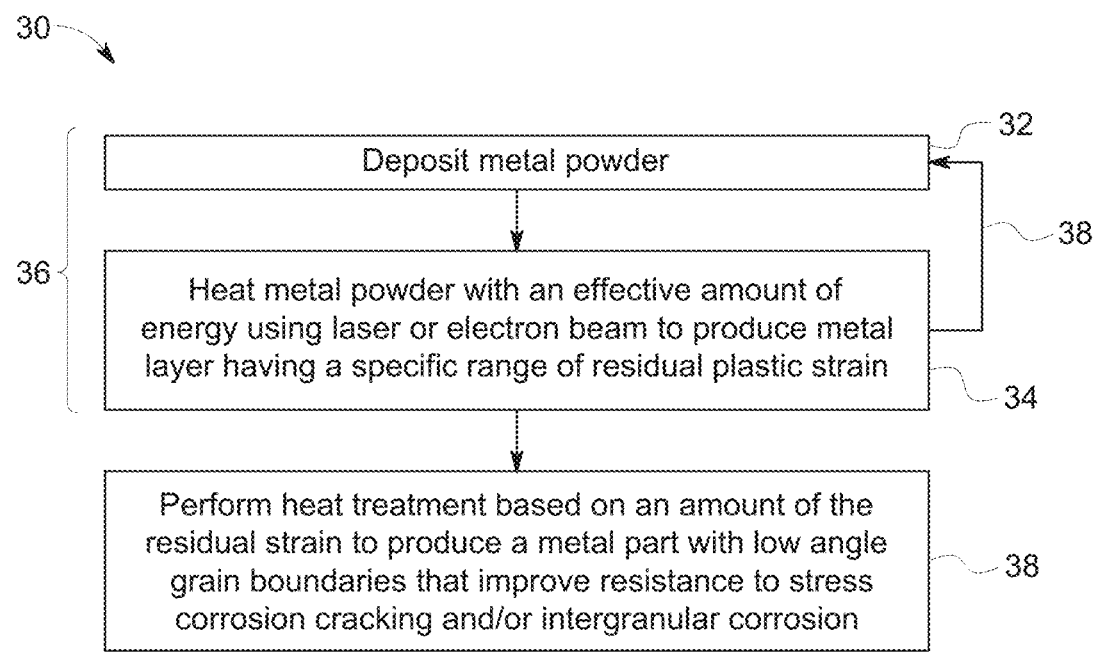
FIG. 5 is a flow chart of a method for manufacturing a metal part with coincidence site lattice (CSL) grain boundaries and/or low angle grain boundaries, in accordance with embodiments of the present technique.

Accordingly, as noted above, embodiments of the present disclosure provide enhanced grain boundary engineering using a laser powder bed additive manufacturing process or an electron beam powder bed additive manufacturing process, to introduce an as-deposited critical strain, that in combination with subsequent heat treatment, will achieve metal parts having substantially distributed CSL grain boundaries and/or low angle grain boundaries throughout the metal part. To illustrate, FIG. 5 is a flow chart illustrating an embodiment of a method 30 for using a laser to additively manufacture a metal part with substantially distributed CSL grain boundaries and/or low angle grain boundaries, in accordance with embodiments of the present technique. Although the method 30 focuses on laser powder bed additive manufacturing, it should be understood that a similar method may be used with electron beam powder bed additive manufacturing. The illustrated method 30 begins with depositing (block 32) a layer of metal powder. For example, the layer of metal powder may be deposited on top of a stage of an additive manufacturing system, or on top of a previously formed layer of the metal part. In certain embodiments, the metal powder may include any suitable metal, such as a nickel-based alloy, a stainless steel alloy, a cobalt-based alloy, a copper-based alloy, aluminum-based alloy, or the like. In certain embodiments, the thickness of the deposited layer of metal powder may be in the range of 10 micrometers (μm) to 200 μm. After deposition, the metal powder is subjected to (block 34) an effective amount of energy (e.g., heat) using a laser or electron beam to rapidly melt the metal powder and then quickly cool into a microstructure having a critical amount of residual strain used to produce CSL boundaries and/or low angle grain boundaries after heat treatment. As previously noted, "critical" may refer to an amount that is at a point of causing a transformation from one state to another (e.g., from equiaxed grain boundaries to abnormal grain boundaries). It may be appreciated that blocks 32 and 34 may be collectively referred to as a laser powder bed additive manufacturing process 36.

It is presently recognized that certain parameters of the laser powder bed additive manufacturing process 36 may be controlled to produce the desired amount of residual strain substantially distributed throughout the microstructure (e.g., between 40% to 80% of the microstructure area) of the material, and that this residual strain results in Abnormal Grain Growth (AGG) or Critical Grain Growth (CGG) during subsequent heat treatment. For example, these parameters may include, but are not limited to: the energy output of the laser, the hatching space, the thickness of the deposited layer, the scan speed of the laser, shield gas flow, vacuum level, scan strategy/pattern, layer thickness and the like. It may be appreciated that these parameters are interdependent and may vary depending on the nature of metal powder; however, these parameters can generally be tuned to produce metal part having the desired residual strain to induce abnormal grain growth and introduce the CSL grain boundaries and/or the low angle grain boundaries during heat treatment. In certain embodiment, the desired amount of residual strain is between approximately 5% and approximately 15% in the microstructure of the metal part after the effective amount of energy has been delivered.

For example, in some embodiments, to enable the desired amount of residual strain to be introduced into the microstructure of the metal part, the output energy of the laser may be in the range of 100 watts to 800 watts. The hatch spacing may be a function of melt pool dimensions and influenced by the energy output and scan speed of the laser. For example, in some embodiments, the hatch spacing may be in the range of between 30 micrometers to 500 micrometers. Further, in some embodiments, the layer thickness may be in the range of 10 micrometers (μm) to 100 μm.

The scan speed of the laser may refer to the speed at which the laser moves over the layer of metal powder. In some embodiments, the scan speed may be in the range of 0.1 meters per second (m/s) to 5 m/s (e.g., approximately 0.6 m/s). In certain embodiments, it is presently recognized that a relatively slower scan speed may be desirable to slow down the local cooling rate of the metal layer. For example, if the scan speed is too fast, then too much residual strain (e.g., greater than approximately 15%) may be introduced into the layer of the metal part. By further example, if the scan speed is too slow, then too little residual strain (e.g., less than approximately 5%) may be introduced into the layer of the metal part. Accordingly, the scan speed of the laser may be controlled, in combination with the other parameters of the laser powder bed additive manufacturing process 36, to enter a desirable finite amount of energy into the layer of the metal part to introduce the desired residual strain in the microstructure of the layer of the metal part.

In some embodiments, a mathematical calculation may be used to determine the parameters of laser powder bed additive manufacturing process 36 to introduce the desired amount of residual strain into the microstructure of the metal part. For example, a model (e.g., mathematical, physics-based) may be used that takes, as inputs, information regarding the nature of the laser (e.g., wavelength, energy output) and the nature of the metal powder (e.g., composition, particle size, heat transfer coefficient), and provides, as outputs, parameters (e.g., thickness of the metal powder layer, scan speed) to be used during the laser powder bed additive manufacturing process 36 that provide the desired thermal variation (e.g., heating and cooling at desired rates) to introduce the desired amount of residual strain into each layer of the metal part.

In some embodiments, it may be desirable to include CSL grain boundaries and/or low angle grain boundaries in some portions of the microstructure and equiaxed grain boundaries in other portions of the microstructure. That is, some parts of the metal may be particularly prone to stress corrosion cracking, and thus, may benefit more from the CSL grain boundaries and/or low angle grain boundaries. Whereas, other portions may benefit more from the properties provided by the equiaxed grain boundaries. For example, grain boundary engineering may be applied to an outer surface of a metal part to include the CSL grain boundaries and/or low angle boundaries to improve resistance to stress corrosion cracking, and not to the internal portions of the metal part. Accordingly, the techniques disclosed herein may enable customizing the metal part to include the benefits of each grain boundary by selectively inserting the grain boundaries (e.g., CSL, low angle, equi-axed) where desired. In some embodiments, selectively inserting the grain boundaries may include controlling the parameters of laser powder bed additive manufacturing process 36 to introduce the desired amounts of residual strain into the microstructure of the metal part.

Further, in some embodiments, the parameters of the laser powder bed additive manufacturing process 36 may be controlled to produce grains with certain sizes to enable the CSL grain boundaries and/or the low angle grain boundaries to form. For example, the finer the as-deposited grain size the more likely it is that CSL grain boundaries and/or low angle grain boundaries will form after heat treatment. In general, desirable as deposited grain sizes may include between ASTM grain size number 4 (e.g., 91 microns) to ASTM grain size number 6 (mean intercept grain size ~28 microns).

When the first layer of the metal part is complete, the laser powder bed additive manufacturing 36 may be repeated as many times as desirable until all layers are added to form the metal part, as shown by arrow 38. For example, a second layer of metal powder may be deposited (block 34) on top of the first layer, and the second layer may be heated (block 36) with the laser to produce a metal layer also having the desired amount of residual strain. Accordingly, after heating, each metal layer added to the metal part may have the desired amount of residual strain included uniformly throughout microstructure of the metal part. As noted above, the metal part may include a part having a complex 3D geometry, such as a disk, a nut, a bolt, a valve body, or the like.

After all of the layers of the metal part have been formed using the laser powder bed additive manufacturing process 36 (or electron beam powder bed additive manufacturing process), the illustrated method 30 continues with performing (block 38) a heat treatment on the metal part to convert the residual strain in the microstructure of the metal part into a microstructure having abnormal grain shapes and substantially distributed CSL grain boundaries and/or low angle grain boundaries. That is, it is presently recognized that the residual strain included in the microstructure of each layer as a result of the selected laser parameters during the laser powder bed additive manufacturing process 36 represents retained energy that can be transformed using specific heat treatment parameters to produce CSL grain boundaries and/or low angle grain boundaries in the microstructure of the metal part. The heat treatment parameters generally include time and temperature, and may include a temperature program (e.g., including particular heating and cooling rates) in certain embodiments. The values of the parameters of the heat treatment may depend on the nature of the metal and/or the amount of residual strain introduced into the microstructure during the laser powder bed additive manufacturing process 36. For example, in certain embodiments, the duration of the heat treatment may be a function of the size of the metal part, giving larger metal parts additional time for the aforementioned transformation to occur. For certain metals, such as stainless steel alloys, the heat treatment temperature parameter may be in the range of 1700 degrees Fahrenheit (° F.) to 2150° F., and the heat treatment time parameter may be in the range of 0.5 hours to 100 hours. In addition, the time and temperature parameters may depend on whether the metal part is placed in air or inert gas during the heat treatment, whether water/oil quench is applied, or the like.

For example, in an embodiment, utilizing a laser scan speed of 0.6 meters per second may result in 5% to 15% residual strain being introduced into the microstructure of the metal part. As such, a heat treatment temperature parameter may be set to 2000° F. to enable abnormal grain growth and formation of substantially distributed CSL grain boundaries and/or low angle grain boundaries from the residual strain. In certain cases, it is recognized that, if the laser scan speed is faster, then the heat treatment temperature parameter may be lowered. In other words, it is presently recognized that the heat treatment parameters may be selected to balance the energy present in the form of residual strain in the microstructure of the metal part. In general, it is presently recognized that, if the heat treatment parameter is set too high, then the residual strain may be eliminated from the metal part without the formation of abnormally shaped grains having substantially distributed CSL grain boundaries and/or low angle grain boundaries. Likewise, it is recognized that, if there is a lower amount of residual strain present in the microstructure of the metal part, then a higher heat treatment temperature parameter may be selected. After the heat treatment is performed, there may be zero or a minimum amount of residual strain (e.g., less than 5%, less than 2%, less than 1%) remaining in the microstructure since this retained energy (e.g., mechanical, thermal) is used to drive this process of abnormal grain growth.

After heat treatment is completed, the resulting metal part has distributed CSL grain boundaries and/or low angle grain boundaries that generally disconnect the regular grain boundary network and improve resistance to stress corrosion cracking and/or intergranular corrosion, as well as improve hold time fatigue. To quantify the resistance, crack growth rates of the microstructure of a metal part may be determined. These crack growth rates represent measurements of how fast a crack moves through the metal part in a given environment (e.g., oxygenated, high-temperature water). The crack growth rate with the CSL grain boundaries and/or low angle grain boundaries of the present technique have been demonstrated to be in the range of $1 \times 10^{-9}$ millimeters per second (mm/s) to $1 \times 10^{-7}$ mm/s in oxygenated high temperature water. In comparison, the crack growth rates of microstructures without the low grain boundaries have been demonstrated to be in the range of $1 \times 10^{-8}$ mm/s to $1 \times 10^{-6}$ mm/s in oxygenated high temperature water. As such, the low range of crack growth rates observed for the CSL grain boundaries and/or low angle grain boundaries of the present embodiments indicate that metal parts manufactured using the method 30 demonstrate enhanced stress corrosion crack resistance. It should be noted, that the reduced crack growth rates observed may result from mix-mode cracking of intergranular cracking and transgranular cracking enabled by the CSL grain boundaries and/or low angle grain boundaries.

Figure 6:
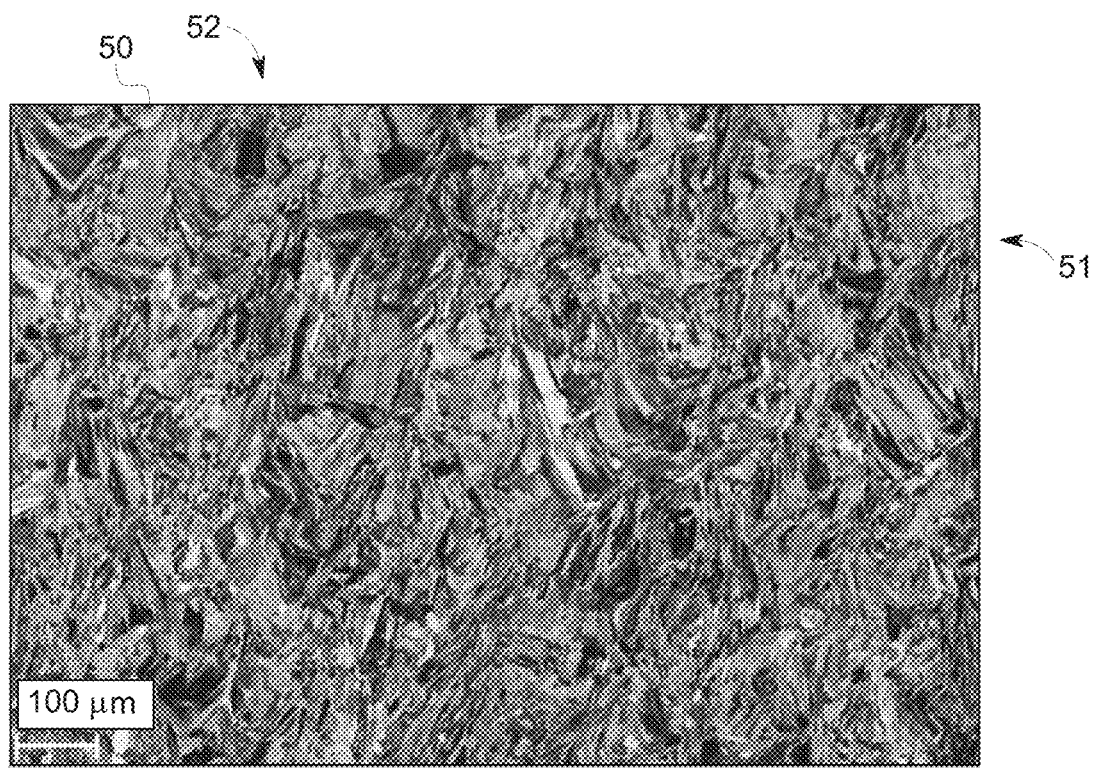
FIG. 6 is a back-scattered scanning electron microscope (SEM) image of a microstructure of a metal part in a strained state prior to heat treatment, in accordance with embodiments of the present technique.
Figure 7:
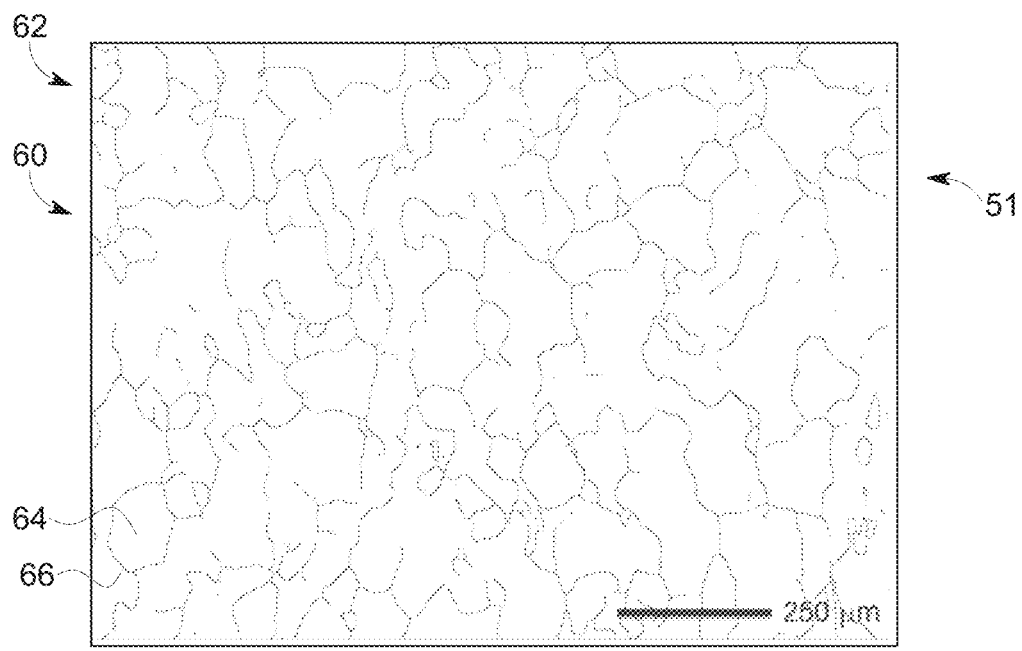
FIG. 7 is an EBSD image that illustrates the broken microstructure network of equiaxed random grain boundaries of FIG. 6 after heat treatment having substantially distributed CSL grain boundaries and/or low angle boundaries, in accordance with embodiments of the present technique.

To illustrate the microstructure of a metal part as it progresses through the method 30, FIG. 6 depicts a back-scattered SEM image 50 of a microstructure 52 of a stainless steel metal part 51 in a strained state prior to heat treatment, and FIG. 7 depicts an electron back-scattered diffraction image 60 of a microstructure 62 of the stainless steel metal part 51 having substantially distributed CSL grain boundaries and/or low angle grain boundaries in a post heat treatment state, in accordance with embodiments of the present technique.

Starting with FIG. 6, the microstructure 52 includes the critical amount of residual strain introduced during the laser powder bed additive manufacturing process 30. As depicted, the microstructure 52 has not fully recrystallized (e.g., there are pockets of crystallization) as a result of the parameters used for the laser powder bed additive manufacturing process 36. To transform the residual strain (retained energy) into abnormal grain growth that recrystallizes to produce CSL grain boundaries and/or low angle grain boundaries, heat treatment may be applied. The resulting microstructure 62 after heat treatment is shown in the back-scattered SEM image 60 of FIG. 7.

For the illustrated embodiment, the heat treatment parameters applied to produce the depicted microstructure 62 include a temperature of approximately 2100° F. for approximately 2 hours. As may be appreciated, the grain structures 64 depicted in the microstructure 62 appear abnormal in shape (e.g., highly complex, irregular, not simple geometric shapes). In addition, grain boundaries 66 of the microstructure 62 of the stainless steel (e.g., 316L) metal part 51 that results from the method 30 may not include a substantial number of twin grain boundaries. That is, the CSL grain boundaries 66 may be less than Σ29 rated grain boundaries and/or the low angle grain boundaries 66 depicted may be Σ3 rated grain boundaries. Also, as depicted, the CSL grain boundaries and/or low angle grain boundaries 66 are substantially distributed (e.g., between 40% and 80% of microstructure area) throughout the microstructure 62. Further, as depicted, the grain boundaries 66 are discontinuous and do not form an interconnected network that enables traversal from one side of the microstructure to the other via a single path along the grain boundaries 66.

Figure 8:
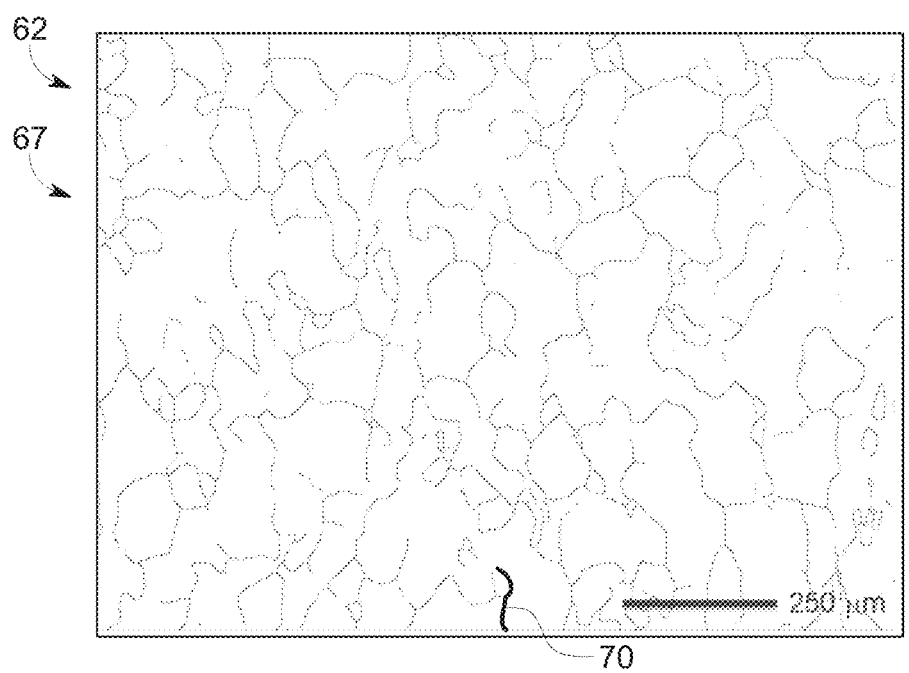
FIG. 8 is an EBSD image of the microstructure of FIG. 7 including an example crack path extending along the CSL grain boundaries and/or low angle grain boundaries, in accordance with embodiments of the present technique.

Thus, for metal parts produced according to the disclosed technique, a crack path may be blocked by the discontinuous grain boundary network by the CSL grain boundaries and/or low angle grain boundaries. For example, FIG. 8 depicts another electron back-scattered diffraction image 67 of an example crack path 70 extending along the CSL grain boundaries and/or low angle grain boundaries of the microstructure 62 of FIG. 7, in accordance with embodiments of the present technique. As depicted, the crack path 70 does not extend throughout the illustrated portion of the microstructure 62. The crack path 70 follows the grain boundaries 66 based on their orientation, and since the orientation of the grain boundaries 66 include CSL grain boundaries and/or low angle grain boundaries throughout the microstructure 62, the crack path 70 is unable to propagate throughout the microstructure 62. Additional energy would be necessitated to crack through a grain structure (e.g., transgranular cracking). Thus, the CSL grain boundaries and/or low angle grain boundaries enable mix-mode cracking of intergranular and transgranular cracking, which enhances stress corrosion cracking resistance.

Technical effects of the disclosure include enabling the manufacture of metal parts having a complex geometry and increased resistance to stress corrosion cracking and intergranular corrosion, as well as improved hold time fatigue, which increases the service life of the metal parts in harsh operational environments. The disclosed manufacturing method generally includes using laser powder bed additive manufacturing or electron beam powder bed additive manufacturing to selectively provide an effective amount of energy that introduces a desired amount of residual strain into the microstructure of each layer of the metal part. The method further includes performing a heat treatment of the metal part to transform this residual strain into a microstructure having abnormal grain growth that produces CSL grain boundaries and/or low angle grain boundaries. The CSL grain boundaries and/or low angle grain boundaries may be substantially distributed throughout the microstructure and may be rated as less than Σ29. The techniques disclosed herein may be particularly useful for metal parts used in harsh environments, such as nuclear, oil and gas, power generation, health care devices in human body, and aircraft engine, to name a few.

This written description uses examples to disclose the techniques, including the best mode, and also to enable any person skilled in the art to practice the techniques, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A metal part, comprising:
a material, wherein at least a portion of the material is formed by melting metal powder with a laser or electron beam during a powder bed additive manufacturing process, wherein the portion receives an effective amount of energy from the laser or electron beam during the powder bed additive manufacturing process to introduce an amount of residual strain, and wherein the portion is configured to substantially release the residual strain and transform into a grain boundary engineered material having substantially distributed coincidence site lattice (CSL) grain boundaries, low angle grain boundaries, or both upon heat treatment.

2. The metal part of claim 1, wherein the heat treatment comprises a time parameter and a temperature parameter that are based on at least the substantial amount of residual strain present in the material.

3. The metal part of claim 1, wherein the CSL grain boundaries comprise less than Σ29 grain boundaries and the low angle grain boundaries comprise Σ3 grain boundaries.

4. The metal part of claim 1, wherein the amount of residual strain comprises a residual strain of between approximately 5% and approximately 15%.

5. The metal part of claim 1, wherein the CSL grain boundaries and the low angle grain boundaries exhibit improved stress corrosion cracking resistance, hold time fatigue, or both.

6. The metal part of claim 1, wherein the effective amount of energy is provided by the laser by using at least a laser scan speed of between approximately 0.1 and approximately 5 meters per second, a laser output energy between 100 watts to 800 watts, or both.

7. The metal part of claim 1, wherein the effective amount of energy is provided by the laser or electron beam by controlling a scan speed of the laser or electron beam, an energy output of the laser or electron beam, a hatching space, a thickness of a deposited layer of metal powder, or some combination thereof.

8. The metal part of claim 7, wherein the scan speed of the laser is between 0.1 meters per second and 5 meters per second, the laser energy output is between 100 watts and 800 watts, the hatching space is between 30 micrometers and 500 micrometers, and the layer thickness is between 10 micrometers and 100 micrometers.

9. The metal part of claim 1, wherein at least another portion of the material comprises equiaxed grain boundaries.

10. The metal part of claim 1, wherein the metal part has a complex three-dimensional (3-D) geometry.

11. The metal part of claim 1, wherein the metal part comprises a crack growth rate in the range of $1\times10^{-9}$ millimeters per second to $1\times10^{-7}$ millimeters per second in oxygenated high temperature water.

12. A method of manufacturing a metal part using a laser or electron beam powder bed additive manufacturing process, comprising:
melting each of a plurality of layers of metal powder of the metal part with an effective amount of energy using a laser or electron beam to form the metal part such that at least one or more portions of the metal part have a critical amount of residual strain; and
performing a heat treatment on the metal part that transforms the residual strain into substantially distributed coincidence site lattice (CSL) grain boundaries, low angle grain boundaries, or both in the metal part.

13. The method of claim 12, wherein the heat treatment comprises a time parameter and a temperature parameter that are based on the amount of residual strain present in the metal part, a type of the metal powder, particle size of the metal powder, or some combination thereof.

14. The method of claim 12, wherein the metal part comprises mix-mode cracking comprising intergranular cracking and transgranular cracking that results in a crack growth rate in the range of $1\times10^{-9}$ millimeters per second to $1\times10^{-7}$ millimeters per second in oxygenated high temperature water.

15. The method of claim 12, wherein the effective amount of energy is provided by the laser using parameters comprising a scan speed between 0.1 meters per second and 5 meters per second, an output energy between 100 watts and 800 watts, or some combination thereof.

16. The method of claim 12, wherein the parameters further comprise using a hatching space between 30 micrometers to 500 micrometers, using a layer thickness between 10 micrometers and 100 micrometers, or some combination thereof.

17. A metal part, comprising:
a metal microstructure, wherein at least a portion of the metal microstructure comprises substantially distributed coincidence site lattice (CSL) grain boundaries, low angle grain boundaries, or both that improve hold time fatigue and resistance to stress corrosion cracking, wherein the metal microstructure is formed using a laser or electron beam powder bed additive manufacturing process that delivers an effective amount of energy to introduce an amount of residual strain, and wherein the metal part subsequently undergoes a heat treatment that converts the residual strain into the substantially distributed CSL grain boundaries, low angle grain boundaries, or both in the portion.

18. The metal part of claim 17, wherein the metal microstructure enables a crack growth rate in the range of $1\times10^{-9}$ millimeters per second to $1\times10^{-7}$ millimeters per second in oxygenated high temperature water.

19. The metal part of claim 17, wherein the metal part comprises a complex three-dimensional (3-D) geometry.

20. The metal part of claim 17, wherein parameters of the laser powder bed additive manufacturing process include a laser scan speed between 0.1 meters per second and 5 meters per second, a laser energy output between 100 watts and 800 watts, a hatching space between 30 micrometers and 500 micrometers, a layer thickness between 10 micrometers and 100 micrometers, or some combination thereof.

* * * * *